Feb. 13, 1945.                A. T. HARDING                    2,369,231
                      PRODUCTION OF CRYSTALLINE DEXTROSE
                         Filed Dec. 14, 1942        2 Sheets-Sheet 1
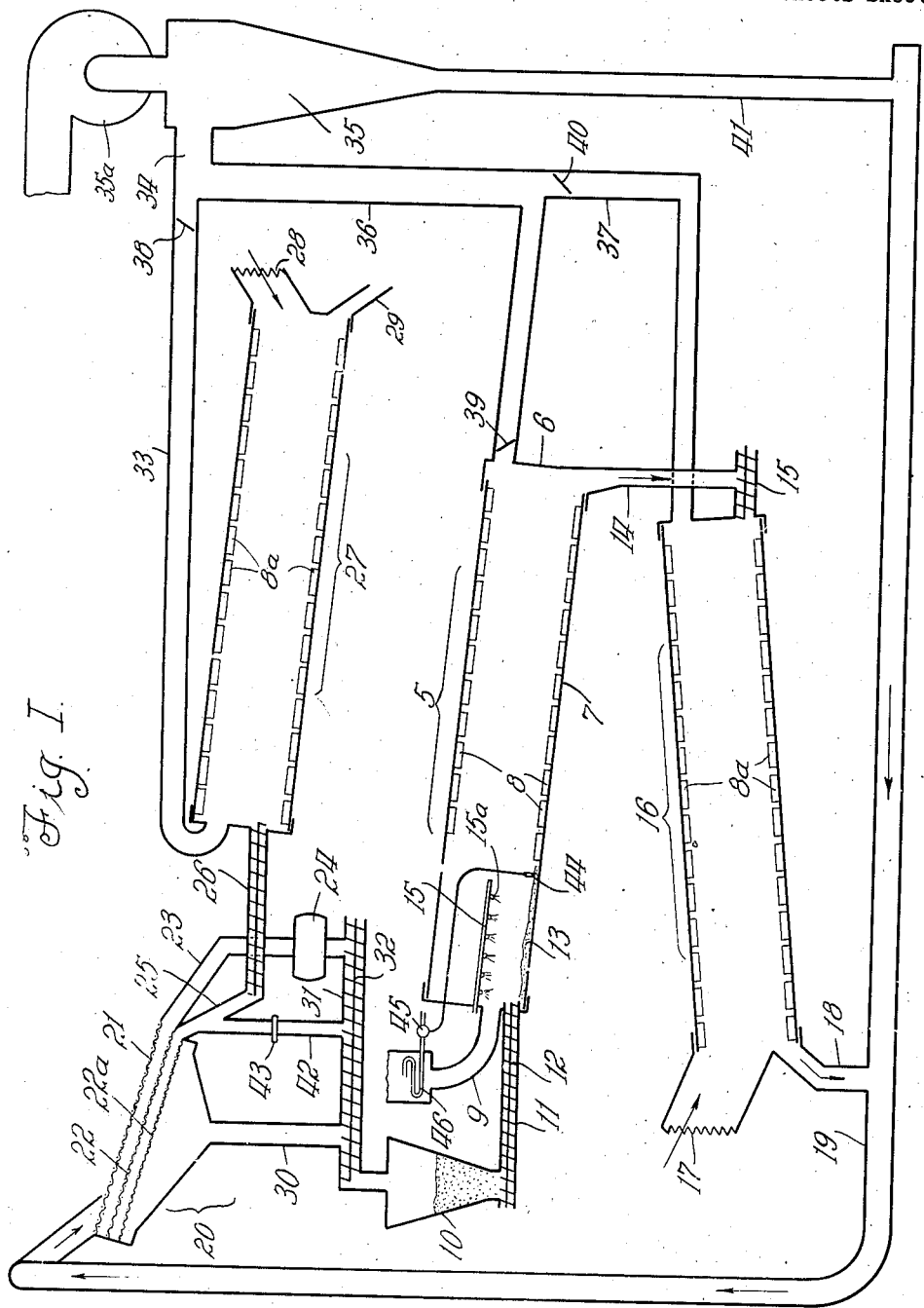
Inventor.
Albert T. Harding
By Robert Gottshall
                Atty.

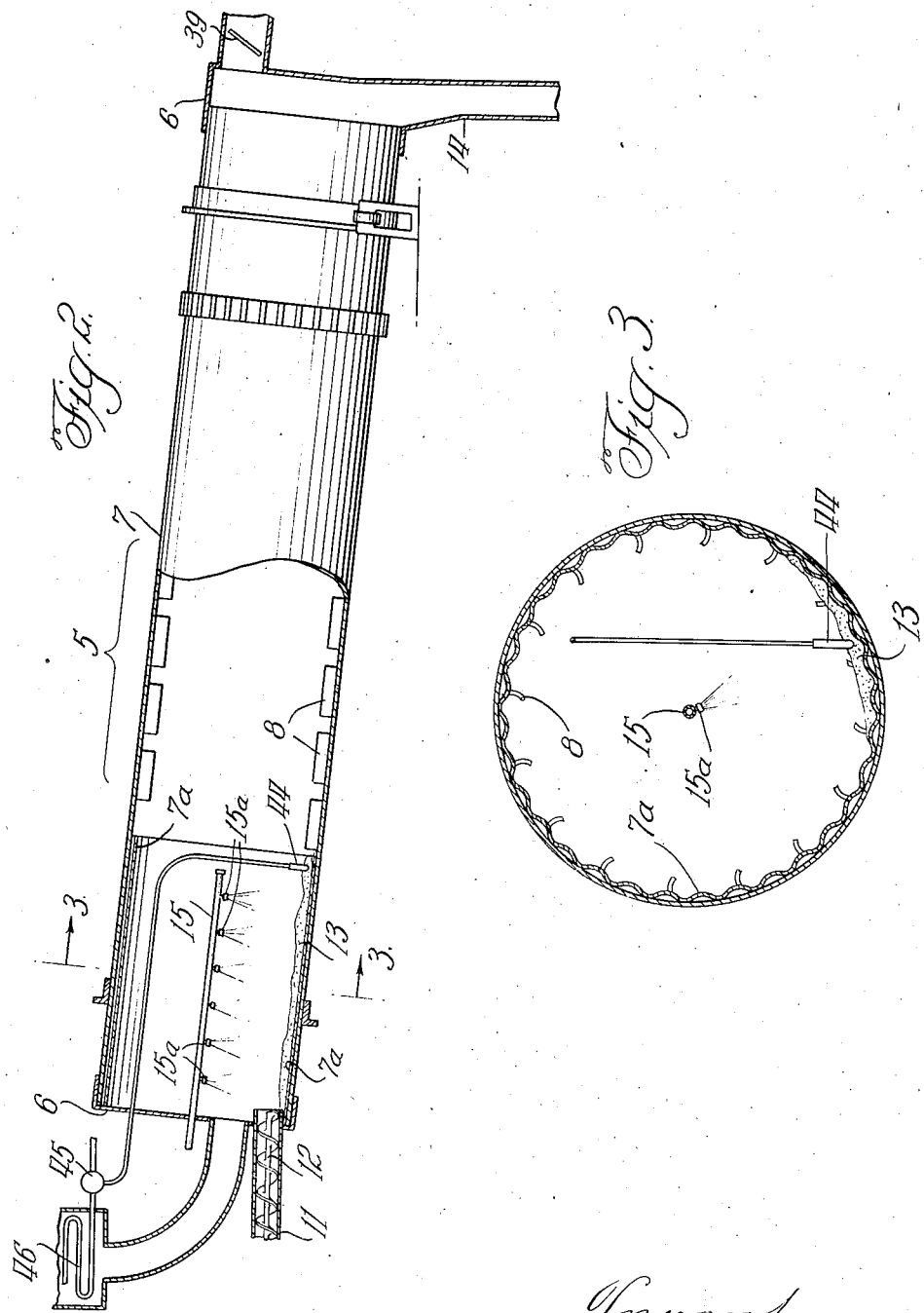

Patented Feb. 13, 1945

2,369,231

UNITED STATES PATENT OFFICE 2,369,231

PRODUCTION OF CRYSTALLINE DEXTROSE

Albert T. Harding, Maywood, Ill., assignor to Corn Products Refining Company, New York, N. Y., a corporation of New Jersey Application December 14, 1942, Serial No. 469,030

7 Claims. (Cl. 127—58)

This invention relates to the manufacture of crystalline dextrose from dextrose-containing liquors such as produced by the acid conversion of starch; and the object of the invention is to provide a process and apparatus, both simple and inexpensive, for the production of crystalline dextrose.

Heretofore, it has been common practice to produce crystalline dextrose by three methods. According to the earlier practices relating to the manufacture of what were then known as corn sugars, so-called "70" and "80" corn sugars were produced by acid converting corn starch, and permitting the relatively impure dextrose-containing liquor to flow into large forms on the floor where, after a period of days, it crystallized. The resultant slabs of sugar were thereafter broken up by a device known as a "chipper" and the sugar was bagged and sold in this form. Such dextrose generally contained a high percentage of impurities even when some of the mother liquor was pressed therefrom.

Later, the art embraced the crystallization of dextrose according to the principles of United States patents to W. B. Newkirk, Nos. 1,471,347, 1,508,569 and 1,521,830. Crystallization in motion, as this practice came to be known, resulted in the formation of purgeable crystals from which the hydrol or mother liquor could readily be removed by centrifuging. While such process is theoretically applicable to the production of all three types of crystalline dextrose, it has been employed, for the most part, in the production of crystalline dextrose in the alpha hydrate form.

Further inventions of W. B. Newkirk related to the process of crystallizing dextrose wherein dextrose-containing liquors are crystallized or "grained" in a vacuum pan. See, for example, his U. S. Patent No. 1,693,118. This process lends itself to the production of all three types of crystallizable dextrose, but is characterized by the disadvantages that it is rather expensive and that the output of crystalline product is relatively limited, so as to require a rather large installation to produce crystalline dextrose in substantial quantities.

The present invention is based upon the discovery that crystalline dextrose may be produced in yet another way, namely, by spraying dextrose-containing liquor upon a bed of dextrose crystals, which serve as "seed," and thereafter subjecting the wetted crystals to intimate contact with a stream of hot air. In this way it has been found possible to produce crystalline dextrose rapidly and inexpensively, and it has been found, moreover, that such operation results in the production of crystalline dextrose in the form of small, generally round pellets, this form being known to the trade as the "pearl" form. Such operation permits the packaging of a product which is substantially free from fines or dust and which, moreover, unlike currently available commercial crystalline dextrose, is not given to dusting.

By the application of known principles, the present invention may be employed for the production of different products, containing different proportions of different types of crystalline dextrose, depending upon the type of crystalline dextrose used as seed and upon the temperatures employed. In practice, no one type of crystal alone is produced, but rather mixtures of the different types, and as the variables referred to are altered or adjusted the resultant products will contain greater or lesser amounts of the different crystal types. In practicing the invention it has been preferred to produce a product containing approximately 35% of beta anhydrous crystals, the balance consisting of crystalline dextrose of one or more other forms. It is to be understood, however, that adjustment of the controlling variables might be made to bring about the production of crystalline dextrose having, for example, a higher content of beta anhydrous crystals, as when beta anhydrous seed and relatively high crystallizing temperatures are employed with liquors containing relatively small amounts of impurities. Alpha anhydrous seed crystals and somewhat lower temperatures will tend, similarly, to result in the production of relatively large percentages of alpha anhydrous crystalline dextrose.

The invention has been found particularly advantageous in producing a crystalline dextrose meeting the requirements of the bottlers of carbonated beverages. These bottlers require a sugar which is inexpensive and rapidly soluble, which does not have too high a color, and which, moreover, is free from "dusting." The product of the present invention, being in pearl form, substantially eliminates the question of dusting, and at the same time, through suitable control of the process conditions, can be made to satisfy the other enumerated requisites important in such applications. The relative rates of solubility (i. e. the relative rates at which substances go into water solution) of sucrose, beta anhydrous dextrose, alpha anhydrous dextrose and alpha hydrate dextrose, all in pure crystalline form, at 77° F., are 1.0, 1.35, 0.55 and 0.35, respectively. Since beta anhydrous dextrose goes into solution much more rapidly than sucrose, it has been found quite practical to produce a crystalline dextrose product, containing approximately 35% of beta anhydrous crystals, which approximates pure sucrose in its solubility rate and which is, moreover, free from color to an objectionable degree. As will appear, a higher percentage of beta anhydrous crystals in the resultant product may be obtained through use of higher temperatures more favorable to the production of beta anhydrous crystals, but it has been found in practice to be desirable to avoid temperatures which are too high since these tend to bring about excessive color in the finished product.

The nature of the invention will more fully appear from the following description, to be read in connection with the accompanying drawings in which Fig. 1 diagrammatically illustrates a preferred form of apparatus for carrying out the invention;

Fig. 2 is a vertical sectional view of the crystallizer of Fig. 1 on an enlarged scale; and Fig. 3 is a sectional view taken on the line 3—3 of Fig. 2.

Referring to the drawings, the numeral 5 designates generally a crystallizer comprising stationary end seals 6 and a drum 7 suitably rotated in any desired manner. The crystallizer 5 is similar to the rotary type of dextrose dryer which has long been used by, and is well known to, those skilled in the art. However, the customary flights 8, disposed around the inner surface of drum 7 and used to elevate dextrose within the rotating drum so that it may fall downwardly therethrough in finely dispersed form, thus to be intimately contacted by the stream of hot air supplied to the drum through pipe 9, are removed from the upstream portion of the drum 7. In practicing the invention it has been found expedient, in employing a crystallizer approximately 32 feet in length, to remove the customary flights from the first 8 feet of the drum, leaving a relatively smooth surfaced section of the drum in which the bed of seed crystals can be formed, but in which such bed is agitated, on rotation of the drum, by corrugations or the like 7a.

Crystalline dextrose which is to act as seed in the production of crystalline dextrose within the drum 7 is supplied to the drum of a hopper 10 through conduit 11, as by means of screw conveyor 12. The crystals thus delivered to the drum form a bed 13 at the entering end of the crystallizer 5 at the bottom thereof. Rotation of the drum 7 maintains the bed in a state of agitation, partly as a result of the tendency of the bed of crystals to be carried upwardly along the inner walls of the drum 7 in the direction of the rotation of the drum, as indicated in Fig. 3 of the drawings. Dextrose-containing liquor is supplied to a header 15 extending lengthwise of the drum, and is discharged therefrom through a series of spray nozzles 15a. The dextrose-containing liquor is discharged preferably under a pressure of about 60–70 pounds per square inch, and the nozzles are of such type as to create a relatively fine spray of the discharged liquor, directed substantially perpendicularly against and upon the surface of the bed of seed crystals 13. The discharge of the dextrose-containing liquor in the form of fine particles upon a bed of crystalline seed has been found essential to the attainment of desired results. While the invention permits of some variation and adjustment, departure from this concept tends to bring about caking and lumping which interfere to a marked degree with successful operation of the process and may altogether prevent the attainment of desired results.

In producing a crystalline dextrose of the preferred type above referred to, i. e. containing, on the average, about 35% of beta anhydrous crystals, the air introduced through pipe 9 should be at a temperature of about 320° (300°–350° F.), according to preferred practice. The temperature and volume of air introduced are adjusted in any case to insure the maintenance of desired crystallizing temperature of the dextrose-containing liquor undergoing crystallization. Evaporation of moisture from such liquor tends to cool both the liquor and the ambient air, in accordance with familiar psychrometric principles. Consequently the initial temperature of the air must be sufficiently high, with relation to the volume of air introduced and the volume of water to be evaporated, so that the dextrose containing liquor is not, at least during the initial stages of crystallization, permitted to be cooled below a temperature favorable to the production of the desired type of crystalline product. The desired control of temperature may, as a practical matter, be effected by means of a thermostat 44 disposed within crystallizer 5 within the bed 13 at the far end thereof, such thermostat suitably controlling valve 45 adjustably controlling the admission of heating medium, such as steam, to heater 46 disposed in pipe 9. If crystallization is initiated at a temperature permitting the formation of a crystalline product of desired type, the temperature may be lowered somewhat thereafter without affecting the type of crystalline product formed. Thus if an appropriate temperature is assured at the point where the wetted crystals leave the bed for dispersion and continued contact with the air stream, the desired type of crystalline formation will follow although the temperature obtaining in the downstream portions of crystallizer 5 may be somewhat lower than the preferred crystallization temperature range. Thus, for example, in preferred practice of the invention as aforesaid, the air leaves crystallizer 5 at a temperature of about 185°–195° F. By suitable adjustment of thermostat 44 to provide the desired temperature, at such point desired, control of the type of crystalline product produced may be effected.

In practicing the invention to produce the preferred type of product, which requires that crystallization be initiated at about 200° F. (190°–210° F.), i. e. that the temperature effecting thermostat 44 be maintained at about 200° F. (190°–210° F.), it has been found expedient to introduce dextrose-containing liquor to the crystallizer at a temperature of about 200° F. (190°–210° F.). It will be understood that the temperature of the liquor could be varied somewhat from this recommended temperature, or even from such range of temperature, although in such event suitable compensatory change in the temperature of the air stream would be required. Also, the liquor is preferably introduced at a density of about 45° (44°–46°) Baumé. More dilute solutions than this could be used, but the greater quantities of water then required to be evaporated would tend to cause more cooling, and this would, in turn, require that higher air temperatures and/or greater air volumes be used to maintain crystallization temperature within the desired range. Moreover, this would tend in the direction of creating conditions causing lumping and caking, which would seriously interfere with intended operation of the process. Conversely, more highly concentrated solutions might be used but considerable mechanical difficulty is generally experienced in commercial operations where sugar liquors of such high gravity are required to be handled.

In practicing the invention any high gravity dextrose-containing liquor may be used. Thus, it has been found expedient and desirable to use for this purpose first greens derived from the centrifuging of alpha anhydrous dextrose crystals produced, for example, by conventional processes including graining in the pan as referred to above. This liquor is preferably diluted with water to about 28° (25°–30°) Baumé from an original density of about 32° Baumé, and is then treated with about 0.5% of vegetable carbon, such as Darco, for about 30 minutes, at the end of which time the liquor is filtered to remove both such carbon and the impurities removed thereby. The filtered liquor is then delivered to a concentrating device such as a vacuum pan and concentrated to a density of about 45° (44°–46°) Baumé as noted above. Such liquor is relatively free from impurities. It will be seen that, according to the present invention, impurities present in dextrose-containing liquor delivered to the crystallizer are not removed, as by centrifuging, pressing, or the like as in other known processes for the production of crystalline dextrose, but remain in the finished product. Thus a relatively pure liquor results in a relatively pure finished product, whereas the converse is also true. Moreover, colloidal impurities, if present in the liquor, would tend to have an adverse effect on desired crystallization. They tend to slow down such crystallization, sometimes to the extent of causing the apparatus to clog through the formation of lumps and masses rather than crystalline substances, and in all cases tend to produce an inferior product and to make for more expensive operation.

If desired, one might employ for delivery to the crystallizer 5 the liquor which, according to current conventional practice, is supplied to the crystallizers in which dextrose hydrate is produced by crystallization in motion, or one might employ first greens derived from the centrifuging of dextrose hydrate so formed; and, moreover, one might, to obtain a product quite free from impurities, remelt centrifuged crystalline dextrose, (e. g. dextrose hydrate) and supply the resultant melt to crystallizer 5.

The selection of crystalline dextrose used as seed in initiating operation of the process will be governed, in the light of established and well known principles, by the type of product which is to be produced. Thus if, for example, a large portion of beta anhydrous dextrose is desired in the finished product, the material forming the bed 13 will, in commencing operation, be crystalline dextrose entirely or largely of the beta anhydrous type. Similarly, if alpha anhydrous crystals are desired to a large extent in the finished product, the material forming bed 13 upon commencement of the operation of the process will be crystalline dextrose entirely or largely of the alpha anhydrous type.

As has been indicated, the temperature at which the dextrose-containing liquor is introduced may be raised above 200° F., as specified above, to produce conditions more favorable to the production of beta anhydrous crystals, as, for example, to a temperature of about 215° or 220° F. However, such higher temperatures appear to entail higher color in the resultant product, which is, for most purposes, to be avoided.

The temperature obtaining in hopper 10 is about 120° to 150° F. and the sugar delivered therefrom to the bed 13 by conveyor 12 is heated by the hot air delivered through pipe 9 to the crystallizer. The bed 13 of dextrose crystals serving as seed is maintained at a temperature of about 180° to about 220° F. The rotation of drum 7, by agitating the dextrose crystals of the bed 13, presents a constantly changing surface upon which the sprayed dextrose-containing liquor impinges, so that the dextrose seed crystals become mixed with and coated or wetted by the sprayed liquor. The crystallizer is inclined slightly to the horizontal (as in conventional sugar drier practice) so as to bring about a gradual movement, by force of gravity, through the crystallizer of the materials supplied thereto. In practicing the invention with a crystallizer 32 feet in length and 6 feet in diameter it has been found expedient to rotate the drum at the rate of 6 revolutions per minute, and under such conditions it has been found that complete passage of material through the crystallizer takes from 30 to 45 minutes. As the wetted dextrose crystals pass beyond the first section of the drum 7, wherein the bed 13 is formed, which section may be termed a wetting zone, they are subjected throughout the balance of the length of the crystallizer 5, in what may be termed a crystallizing zone, to the action of flights 8. These serve to raise the wetted dextrose crystals and then to drop them in the form of finely divided dispersed particles. The wetted crystals are thereby intimately contacted with the stream of hot air flowing through the crystallizer, and consequently the desired crystallization of the dextrose in the liquor sprayed upon the seed crystals is effected.

The crystalline product, in "pearl" form, is delivered from crystallizer 5 through pipe 14 and by means of a conveyor 15 is introduced within a cooler 16 of conventional type, which is similar, generally, to crystallizer 5 in construction, except that the cooler preferably contains flights or the like throughout its length. Cooling air, which may be drawn from the outdoor atmosphere and is preferably filtered at 17, is caused to circulate through the cooler 16, cooling the crystalline dextrose passing therethrough to a leaving temperature of 120° to 150° F., and removing moisture therefrom. The removal of moisture is desirable, as is well known in the art of sugar drying, to prevent caking which would normally occur if sugar were cooled without ample opportunity for the carrying off of moisture therefrom. The dextrose preferably is not cooled to a temperature substantially below 120° F. as this would tend to bring about lumping and sticking of dextrose returned to the crystallizer as seed. The cooled dextrose is delivered from cooler 16 through a conduit 18 to a conveyor 19, which may be of the type known as a Redler conveyor, and is delivered thereby to a screening device 20. The crystalline dextrose delivered to the screening device contains particles of different sizes. The mixture is delivered to a coarse jigger screen 21 and the materials which pass therethrough but which remain upon a 10 mesh screen 22, pass from the device 20 through a conduit 23 to a mill 24 where this relatively coarse material is ground.

Dextrose which passes through the 10 mesh screen 22 but which remains upon a 24 mesh screen 22a is of a size regarded as desirable in the finished product. Such material, therefore, is delivered from screening device 20 through conduit 25 and is, by means of conveyor 26, delivered to a final cooler and dryer 27 wherein the temperature of the crystalline dextrose is lowered to between 70° and 100° F. The cooling of crystalline dextrose within cooler 27 is effected by means of air delivered to the cooler, from any desired source, such as the outdoor atmosphere, preferably through filter 28. The cooled finished product, ready for packaging or use, is delivered from cooler 27 through outlet 29. The cooler 27, as the cooler 16, may be of any desired type but preferably is of conventional type corresponding generally to crystallizer 5 in construction, except that the coolers 16 and 27 are preferably both provided with flights or equivalent devices 8a throughout their entire respective lengths, so as to provide maximum opportunity for intimate contact between the crystalline dextrose therein and the air caused to flow therethrough. Cooler 27, however, may be somewhat smaller than crystallizer 5 or cooler 16, since it is not required to handle as much material as crystallizer 5 or cooler 16.

The material which passes through both the 10 mesh screen 22 and 24 mesh screen 22a, i. e., the fines, is delivered through conduit 30 to a supply line 31. The latter is provided with a screw conveyor or the like 32 which delivers to the hopper 10 the fines received from the device 20 and the fines produced by the action of mill 24. These relatively small particles of crystalline dextrose are well adapted to serve as seed in the crystallizing operation hereinabove described, and are, accordingly, returned to the crystallizer 5 for such purpose.

While screens 22 and 22a preferably are of 10 and 24 mesh respectively, as specified, it will be understood that the degree of fineness of these screens may be varied to produce a finished product of any desired particle size.

Approximately two pounds of crystalline dextrose, preferably, is returned to the crystallizer 5 as seed for each pound of finished product removed from the system through outlet 29, i. e. for each pound of dry substance introduced through the spray nozzles 15a, but it will be understood that this ratio may be varied somewhat, and that its actual determination in any given case will depend upon both economic and operating factors. For example, it has been found desirable, in some cases, to operate with this ratio as high as 4:1. However, it will be appreciated that while this tends to facilitate the production of the finished product, by requiring a relatively smaller amount of accretion in the crystallizer 5, such procedure involves the recirculation of relatively large quantities of crystalline dextrose, and this tends to limit the capacity of a given installation and to increase the cost of production of the finished product. For such reasons it is desirable to reduce the amount of crystalline dextrose which is recirculated. On the other hand, if an insufficient quantity of crystalline dextrose is supplied to serve as seed there will be a tendency to the formation of sticky lumps and masses within the crystallizer 5.

The air which is delivered to cooler 27 is relieved therefrom through a pipe 33 which connects with a pipe 34 leading to a cyclone dust collector or the like 35 suitably equipped with an exhaust blower 35a. Similarly, the air supplied to crystallizer 5 is relieved therefrom through a pipe 36 leading to pipe 34, and the air supplied to cooler 16 is relieved therefrom through a pipe 37 leading to pipe 34. The pipes 33, 36 and 37 are preferably provided with dampers or the like, 38, 39 and 40 respectively, to control the flow of air through cooler 27, crystallizer 5 and cooler 16, respectively.

In the case of coolers 16 and 27, the volume of air will be adjusted to effect the desired degree of cooling, and in the case of crystallizer 5 to effect the desired crystallization as evidenced by the discharge of crystalline dextrose, free from lumps, from the crystallizer. In each case the rate of air flow, although preferably adjusted manually or automatically in accordance with changes in operating conditions, will be comparable to that obtaining in conventional drum sugar driers of the type indicated. If desired, the rate of air flow through crystallizer 5 may be controlled by thermostat 44, which, in addition to varying the temperature of the air supplied to the crystallizer, might, for example, serve to adjust the position of damper 39.

Crystalline dextrose separated from the air stream delivered to device 35 is discharged from such device through pipe 41 and delivered thereby to conveyor 19. Thus, this material, together with the material discharged from cooler 16, is delivered to the screening device 20.

If insufficient amounts of fines are returned to the crystallizer as seed through pipe 30 and from mill 24, additional material, which would otherwise be delivered to cooler 27, may be delivered to pipe 31 through pipe 42, under the control of slide valve 43.

Since certain changes may be made in the invention without departing from the scope thereof, it is to be understood that the foregoing description is intended as illustrative only.

I claim:

1. Apparatus for the production of crystalline dextrose comprising a rotating drum having a relatively smooth surfaced wetting section and a crystallizing section equipped with means for agitating and dispersing material contained within said crystallizing section of said drum, means for supplying crystalline dextrose particles to said wetting section and for forming thereof a bed at the bottom of the wetting section of said drum, means for impinging dextrose-containing liquor upon said bed in finely divided form, and means for forcibly circulating hot air through said wetting section and said crystallizing section of said drum, said agitating and dispersing means within said crystallizing section serving to agitate wetted crystals received from said wetting section and to disperse the same for intimate contact with air in said crystallizing section.

2. The process of producing dextrose in the form of small pellets, which comprises forming a bed of dextrose seed crystals, agitating said bed and maintaining the temperature thereof at about 180° F. to about 220° F., and spraying thereupon dextrose-containing liquor at a temperature of about 190° F. to about 210° F., whereby said seed crystals are wetted with said liquor, and thereafter intimately contacting said wetted crystals with hot air.

3. The process of producing dextrose, containing a large proportion of beta dextrose, in the form of small pellets, which comprises impinging dextrose-containing liquor in finely divided form at a temperature of about 190° F. to about 210° F., upon a mass of crystalline dextrose seed particles having a temperature of about 180° F. to about 220° F. while agitating the latter, whereby particles of crystalline dextrose are wetted with said liquor, withdrawing from said mass and dispersing said wetted particles and subjecting said dispersed particles to intimate contact with air at a temperature of about 300° F. to about 350° F.

4. The process of producing dextrose in the form of small pellets, which comprises impinging dextrose containing liquor at a density of about 44° Bé. to about 46° Bé. in finely divided form at a temperature of about 190° F. to about 210° F., upon a mass of crystalline dextrose seed particles having a temperature of about 180° F. to about 220° F. while agitating the latter, whereby particles of crystalline dextrose are wetted with said liquor, withdrawing from said mass and dispersing said wetted particles and subjecting said dispersed particles to intimate contact with air at a temperature of about 300° F. to about 350° F.

5. The process of producing dextrose in the form of small pellets, which comprises forming a bed of crystalline dextrose of relatively small particle size and adapted to serve as seed, maintaining said bed at a temperature of about 180° F. to about 220° F., agitating said bed, wetting said bed during agitation thereof with dextrose containing liquor supplied thereto in finely divided form, and at a temperature of about 190° F. to about 210° F., subjecting said introduced liquor and seed bed to the action of a stream of hot air, and thereafter subjecting crystalline dextrose particles wetted by said liquor to agitation in intimate contact with said air.

6. The process of producing dextrose in the form of small pellets, which comprises forming a bed of dextrose seed crystals, agitating said bed and maintaining the temperature thereof at about 180° F. to about 220° F., spraying thereupon dextrose-containing liquor at a density of about 44° Bé. to about 46° Bé. and at a temperature of about 190° F. to about 210° F., whereby said seed crystals are wetted with said liquor, and thereafter intimately contacting said wetted crystals with hot air, and returning a portion of the resultant crystalline product to the process as seed.

7. The process of producing dextrose, containing a large proportion of beta dextrose, in the form of small pellets, which comprises impinging dextrose containing liquor at a density of about 45° Bé. in finely divided form at a temperature of about 200° F., upon a mass of crystalline dextrose seed particles having a temperature of about 180° F. to about 220° F. while agitating the latter, whereby particles of crystalline dextrose are wetted with said liquor, withdrawing from said mass and dispersing said wetted particles and subjecting said dispersed particles to intimate contact with air at a temperature of about 320° F.

ALBERT T. HARDING.